United States Patent [19]
Armstrong

[11] 3,884,720
[45] May 20, 1975

[54] MULTICELL SEAWATER BATTERY

[75] Inventor: John Armstrong, Winnipeg, Manitoba, Canada

[73] Assignee: ESB Incorporated, Philadelphia, Pa.

[22] Filed: Apr. 9, 1973

[21] Appl. No.: 349,291

Related U.S. Application Data

[63] Continuation-in-part of Ser. No. 323,932, Jan. 15, 1973, abandoned.

[52] U.S. Cl. ........................ 136/100 R; 136/100 M
[51] Int. Cl. ............................................ H01m 17/00
[58] Field of Search .......... 136/100 R, 100 M, 112, 136/114, 90, 159–160, 91

[56]  References Cited
UNITED STATES PATENTS

| | | | |
|---|---|---|---|
| 2,474,716 | 6/1949 | Beechlyn | 136/100 M |
| 3,228,800 | 1/1966 | Kirk | 136/100 R |
| 3,255,048 | 6/1966 | Comanor et al. | 136/100 M |
| 3,427,201 | 2/1969 | Burant et al. | 136/100 R |
| 3,472,699 | 10/1969 | Jackley et al. | 136/100 R |

*Primary Examiner*—Anthony Skapars

[57]  ABSTRACT

A multicell seawater battery is described wherein a series of cells each having a metal halide cathode, a metal anode and an electrolyte space between, is arranged in face to face orientation. A first duct is provided at the bottom of the battery with ports leading to the bottom of each cell. A second duct is provided at the top of the battery with ports leading to the top of each cell. A reservoir is provided behind each metal anode, at the top of each reservoir a port connects to the second duct of the battery located at the top of the battery. A third duct is provided at the bottom of the battery with ports leading to the bottom of each reservoir. One or more ports are provided in each cell leading from the reservoir through the metal anode to the electrolyte space. By this configuration, a first electrolyte circulation path is sustained from the third duct (at the bottom of the battery) into the reservoir, through the port or ports in the anode and out the second duct (at the top of the battery) while at the same time a second circulation path exists from the electrolyte space through the first duct (at the bottom of the battery). In addition, the reservoir is available to feed fresh electrolyte to the cell via the port or ports therebetween.

9 Claims, 4 Drawing Figures

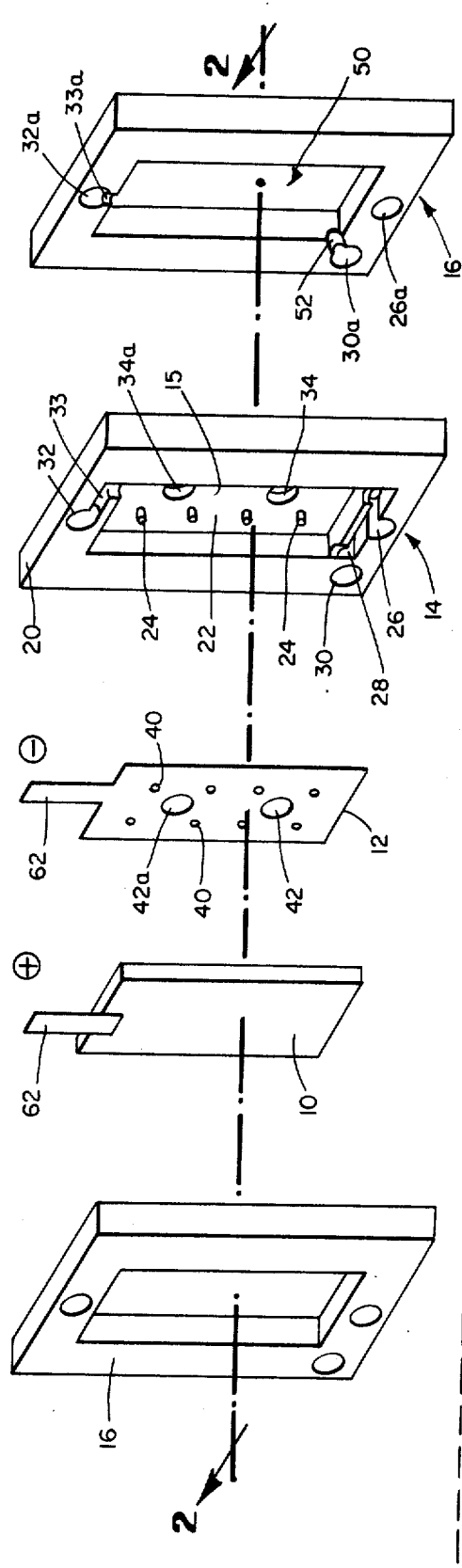
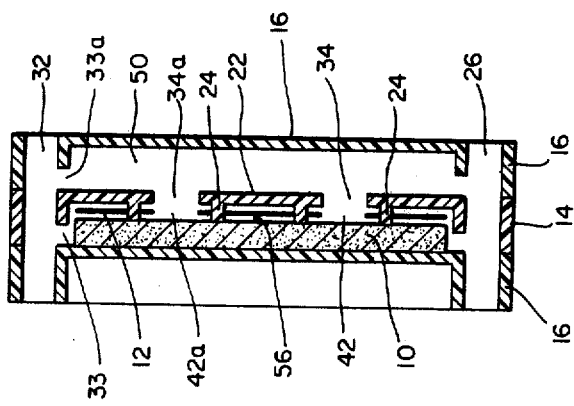
Fig. 1
Fig. 2

SEA WATER SALINITY = 3.5%
SEA WATER TEMPERATURE = 96°F

MULTICELL SEAWATER BATTERY

REFERENCES

This is a continuation-in-part of my application U.S. Ser. No. 323,932 filed Jan. 15, 1973, now abandoned.

BACKGROUND OF THE INVENTION

1. Field of the Invention

This invention relates to deferred action galvanic cells. In particular, it relates to metallic halide-metal batteries activated and operated by immersion in seawater.

2. Description of the Prior Art

It has long been known that a desirable galvanic couple can be made by immersing certain metals and metal halides in seawater. In general, the cathode materials are chosen to be insoluble in the electrolyte and the anode materials are chosen to give soluble reaction products. Among the useful metals (anodes) are zinc, aluminum and magnesium and among the useful metallic salts are silver, copper and lead halides (cathodes).

Multicell batteries of the seawater type using a metallic halide-metal couple differ from most other batteries in that they use a common electrolyte in all cells. This is only possible because seawater is a rather poor conductor of electricity. In high rate discharges of short duration, the electrical leakage is of small importance. However, for low rate discharges for long time periods, the leakage current losses through the common electrolyte may easily become as great as the useful work done by the battery thus preventing the user from obtaining the full amount of energy latent in the battery. Designers of low rate discharge cells have proposed numerous means for reducing the leakage currents. One logical and useful means for accomplishing this is to increase the length of the electrolyte feed passages and by reducing the cross-sectional area of the passages to the minimum. In batteries of the type under discussion, it is necessary to remove the waste products of the electricity producing reactions from the vicinity of the electrodes. This is done by circulation of fresh seawater through the cells. In large batteries built for high rate short duration discharges, mechanized means such as pumps or syphons are often used to move the electrolyte through the cells. For small size cells the complexity of a forced circulation system is not warranted and a natural circulation system based on gas bubble evolution or other force is normally used. It has been found that the available forces are not very great.

A seawater battery has been described wherein a non-reactive electrolyte receiving area is provided adjacent to and in heat transfer relation to the reactive space between the electrodes of the cell. The purpose of the non reactive electrolyte receiving area is to aid in the initial warming of a cold battery. In this form of battery, it is stated that a "chimney effect" caused by gassing of the cell anodes tends to flush out magnesium hydroxide from the battery along with any other foreign substances which might tend to clog the electrolyte passages, cause cell dryout and retard the main battery reaction. In this battery the passages from outside the battery to inside are extremely short so that the flushing of the battery from bottom to top can occur. Because of the shortness of the passages from cell to open water, this battery design will suffer from high electrical leakage currents. These become of major importance at low rates of discharge and can noticeably reduce the expected battery performance.

In low rate batteries where the feed passages have been made long to reduce the leakage losses the flow of electrolyte by natural forces is marginal. A further complication has been found in such batteries. The natural flow of electrolyte through the cell is from the bottom to the top. However, a cell reaction produces an insoluble magnesium hydroxide which is more dense than the seawater and tends to flow downwards collecting in the electrolyte passages and curtailing the needed electrolyte circulation. The result is that the battery discharge is limited by the lack of available electrolyte due to insufficient circulation instead of by the complete utilization of its components.

SUMMARY OF THE INVENTION

In a metal, metal-halide seawater multicell battery a first electrolyte circulation means is provided wherein electrolyte can circulate upward by gas bubble or other forces. A second circulation means is provided whereby reaction products can flow from the electrolyte area down and out at the bottom of the cell. The second means is operated by the greater density of the reaction products compared to water. An electrolyte reservoir is provided adjacent each cell connected to and forming a part of the circulation passages whereby much of the chemical water requirements of the cell can be met without interference from reaction products. A preferred anode is magnesium and preferred cathodes are lead chloride and silver chloride.

BRIEF DESCRIPTION OF THE DRAWINGS

FIG. 1 depicts the several parts which are used to make a cell in accordance with the invention;

FIG. 2 depicts in section one cell made from the parts shown in FIG. 1;

DESCRIPTION OF THE PREFERRED EMBODIMENTS

Figure 3:
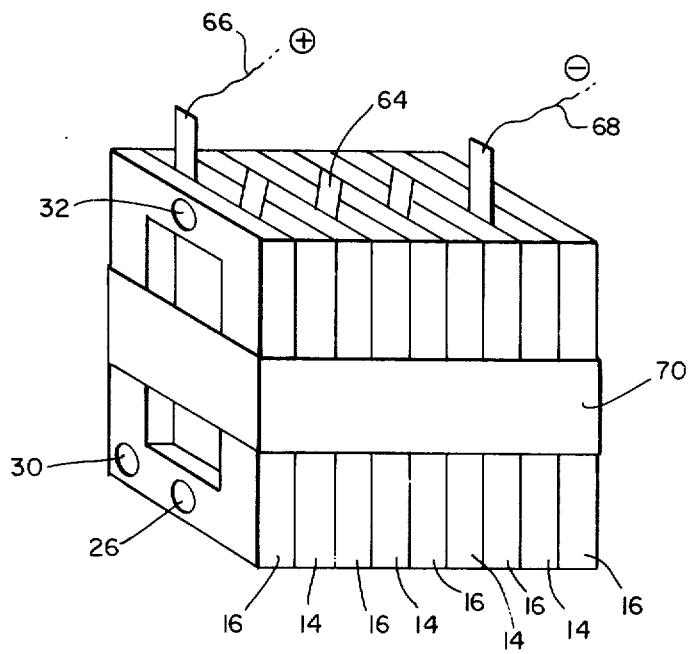
FIG. 3 depicts a multicell battery assembled from parts similar to those of FIG. 1; and, FIG. 4 depicts the results of a test of a battery of the invention.

In FIG. 1, 10 represents a metal halide cathode such as lead chloride, bromide, fluoride or iodide, cuprous chloride, bromide, fluoride or iodide or silver chloride, bromide, fluoride or iodide. 12 represents an anode such as Al, Mg or Zn; 14 is a molded plastic cell container and 16 represents the cell cover. Cell container 14 has a heavy wall 20 forming a cell area 15. A back wall 22 has a number of protruding pins 24 located thereon. A first bottom hole 26 is formed completely through the bottom of wall 20 and is connected by a circuitous port 28 to the bottom of the cell. A second bottom hole 30 is also formed through wall 20 at the bottom of the cell. There is no port between hole 30 and cell area 15. A third hole 32 is formed in wall 20 at the top of the cell and connects to the cell area by circuitous port 33. One or more holes 34 are formed in the back wall 22. The metal anode 12 has holes 40 formed therein which align with the pins 24 so that the anode can be placed in the cell area 15 so as to rest against the back wall 22 of the cell. Pins 24 protrude through the holes 40 and in practice will be expanded so as to hold the metallic plate 12 in place prevent warping of the anode during discharge and provide spacing between the metallic anode 12 and the cathode 10. The back wall 22 may be conveniently made by a compression molding technique. A piece of anode metal having suitable holes punched therethrough is placed in the front portion of a mold. A sheet of thermoplastic resin such as polyethylene is laid on the anode sheet. The second part of the mold, heated, is then placed on top of the plastic and the mold is pressed together. The hot mold softens the plastic and it is formed to the shape of the mold cavity. Individual pins of plastic are forced through the holes in the anode to provide the structure shown in the several figures. The thickness of the cathode 10 is just sufficient to fill the space from the tops of the pins 24 to the surface of the cell walls 20. One or more holes 42 are formed in the anode 12 located over the holes 34 in the back wall 22. The cell cover 16 has a shape similar to the cell container 14. Hole 26a is formed through the bottom wall in a position corresponding to the hole 26. These holes together form a first duct. A hole 30a corresponds to hole 30 and hole 32a corresponds to hole 32. These holes together form a second duct. A reservoir 50 is formed by a depression in the cell cover 16 and the backwall 22 of the cell container. The reservoir 50 may be approximately 2 to 5 times the volume of the active electrolyte volume 56. The reservoir as shown has all plastic walls to aid in keeping the electrolyte contained therein cool. However, this construction is not necessary and some or all of the anode or cathode may form a wall or wall part of the reservoir. A port 52 connects reservoir 50 to hole 30a at the bottom of the battery and a port 33a connects reservoir 50 to the hole 32a at the top of the battery. The five cell parts assembled and sectioned at 2—2 are shown in FIG. 2. It is seen that holes 26, 26a form a duct running along the bottom of the battery and that the holes 32, 32a form a duct running along the top of the battery. An electrolyte space 56 is formed between cathode 10 and anode 12 by the heads of the pins 24. Duct 26 connects to space 56 by the circuitous port 28 (FIG. 1). Duct 32 connects to the electrolyte space 56 by the circuitous port 33 and to the reservoir 50 by port 52. In a similar way, but not shown, holes 30, 30a form duct 30 and duct 30 is connected to the bottom of the reservoir 50 by port 52. Likewise hole 42 and hole 34 form a passageway from the reservoir to the electrolyte space 56. This passageway is not at the bottom of the plates 10 and 12 but is part way up as shown. Additional holes 34a and 42a may be formed through anode 12 and wall 22. Although in the example only single ducts 26, 30 and 32 and single ports 28, 33 and 52 are shown, additional ducts and ports can be provided for increased circulation or when cell size limitations prevent the use of single ducts and ports of a desirable size. In summary it is seen that the battery described includes a series of electrolyte spaces such as 56 and separate reservoirs such as 50, one for each cell. There is a top duct 32 located at the top of the battery, a first plurality of ports such as 33 providing access between the electrolyte space of each cell and the top duct and a second plurality of ports such as 33a providing access between the reservoir of each cell and the top duct. There is a first bottom duct 26 located at the bottom of the battery and a second bottom duct 30 located at the bottom of the battery. A third plurality of ports such as 28 provides access between the electrolyte space such as 56 of each cell and duct 26. A fourth plurality of ports such as 52 provides access between the reservoir such as 50 of each cell and the duct 30. Finally a means such as openings 34 and 42 provides access between the reservoir 50 of each cell and the electrolyte space 56 of each cell.

FIG. 3 shows a battery made up of the parts similar to those of FIG. 1 and FIG. 2. The four cells shown are connected in a four cell series array with the anode of the first cell electrically attached to the cathode of the second cell and so down the battery. A positive terminal 66 is fastened to the cathode of the left hand cell of the assembly and a negative terminal is connected to the anode of the right hand cell. The open ends of ducts 26, 30 and 32 are visible at the end of the battery. The individual cells of the battery are bound together by a wrapping such as shown at 70.

To activate a battery of the invention, the battery is immersed in seawater. During the initial immersion, water enters through ducts 26 and 30 until the battery is flooded. As current is withdrawn from the battery, a first flow equilibrium is established wherein gas and electrolyte pass out duct 32 and new water enters the system by both of the ducts 26 and 30. After a period of time reaction products begin to be liberated They disperse in the electrolyte and sink down, concentrating as they sink. This action tends to reverse the flow of liquid through duct 26 so that in time it becomes an outlet for spent electrolyte containing magnesium hydroxide. The major portion of the feed of electrolyte to the battery is now through duct 30. The outward flow through duct 32 is not stopped by the change in flow in 26 but continues as before. The battery is now in a second equilibrium state with a flow of electrolyte going out both at the top and bottom. The flow provides fresh electrolyte to the electrodes and is normally sufficient to wash out and prevent the accumulation of waste products as found without the provisions of this invention. At the same time, the length of ducts 26, 30 and 32 and the circuitous ports 28 and 33 effectively prevents current leakage between cells.

A critical feature of the battery of this invention is the location of the opening 34–42 from the reservoir space 50 to the electrolyte space 56. If this opening is too near the bottom of the cell there is not enough gravitational head to differentiate between the flow of passages 26 and 30 and the reverse flow does not establish itself. If opening 34–42 is too high, the desirable flow out the top of the cell will not sustain itself. Therefore, it has been found desirable to locate the opening 34–42 at a location between one-fourth and one-half of the height of the plate measured up from the bottom of the plate. However, with the hole at this location, additional ports such as 34a–42a, above mid height of the plate have in some cases proven to be advantageous. In certain discharges sufficient insoluable waste products collect at the bottom of the cells to effectively close the port 26, in spite of the circulation therethrough. When this occurs, the electrical discharge would normally be cut off by electrolyte starvation. However, due to the reservoir 50 and electrolyte feed through hole 30 and port 52, sufficient fresh electrolyte is available in the cell to permit the discharge to run its expected time period.

Figure 4:
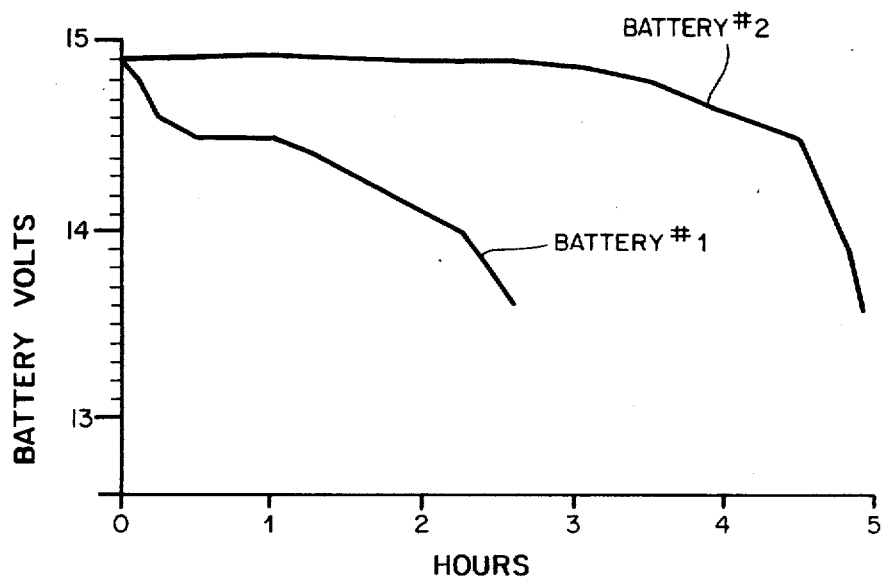

As an example of the efficacy of the seawater battery design of the invention, two batteries were constructed and discharged. The first battery was built using normal construction and having long internal circulation passages. The second battery was identical to the first except that it embodied the several features of the invention, i.e., the third holes 30, the reservoirs 50 and the hole 42, 34 through the anode and the cell wall into the reservoir. Each battery comprised nine cells, each cell having one anode of magnesium alloy approximately 1.7 inches × 2.15 inches and one cathode of silver chloride of approximately the same size. FIG. 4 shows the output of the two batteries tested under identical conditions at an electrical discharge rate of 0.400 amperes. It is to be observed that the battery embodying the invention gave an electrical discharge of 4.92 hours to an end voltage of 13.6 volts whereas the battery built without the improvements gave only 2.55 hours thus showing the improvement found as a result of the invention.

Having fully described my invention and given a detailed description of a preferred embodiment, I hereby claim:

1. A multicell seawater battery wherein a series of cells each having a metal halide cathode, a metal anode arranged in face to face orientation and an electrolyte space therebetween which comprises:
    a. at least one top duct located at the top of the battery each duct connected by at least one port to the electrolyte space of each cell;
    b. at least one first bottom duct located at the bottom of the battery each duct connected by at least one port to the electrolyte space of each cell;
    c. a reservoir located adjacent each metal anode and at least one port leading from each such reservoir to each top duct;
    d. at least one second bottom duct located at the bottom of the battery and connected by at least one port to the reservoir of each cell; and
    e. at least one opening formed through the anode of each cell connecting the reservoir of each cell to the electrolyte space of each cell.

2. A multicell seawater battery as defined in claim 1 wherein the walls of the reservoir of each cell are made of plastic, the wall of the reservoir of each cell adjacent the anode of each cell defining a hole, the hole in the reservoir wall of each cell and the opening in the anode of each cell together forming a passageway between the reservoir of each cell and the electrolyte space of each cell.

3. A multicell seawater battery as defined in claim 1 wherein the opening connecting the reservoir of each cell with the electrolyte space thereof is located between one-fourth and one-half of the height of the anode measured from the bottom of the plates.

4. A multicell seawater battery as defined in claim 1 including at least one additional opening formed through the anode of each cell connecting the reservoir of each cell to the electrolyte space of each cell.

5. A multicell seawater battery as defined in claim 1 wherein the metal of the anode is selected from the group which consists of magnesium, zinc and aluminum and the cathode is selected from the group of materials which consists of the halides of silver, copper and lead.

6. A multicell seawater battery as defined in claim 1 wherein the anode metal is magnesium and the cathode material is silver chloride.

7. A multicell seawater battery as defined in claim 1 wherein the anode metal is magnesium and the cathode material is lead chloride.

8. A multicell seawater battery including several cells each cell having a metal halide cathode and a metal anode and an electrolyte space therebetween, the battery further comprising:
    a. a plurality of reservoirs, one for each cell and adjacent thereto, each reservoir being separate from the electrolyte space of each said cell;
    b. a top duct located at the top of the battery;
    c. a first plurality of ports providing access between the electrolyte spaces of the several cells and the top duct;
    d. a second plurality of ports providing access between the reservoirs of the several cells and the top duct;
    e. a first bottom duct located at the bottom of the battery;
    f. a second bottom duct located at the bottom of the battery;
    g. a third plurality of ports providing access between the electrolyte spaces of the several cells and the first bottom duct;
    h. a fourth plurality of ports providing access between the reservoirs of the several cells and the second bottom duct; and,
    i. means for providing access between the reservoir of each cell and the corresponding electrolyte space.

9. A multicell seawater battery as defined in claim 8 wherein the ports of the first plurality providing access between the several electrolyte spaces and the top duct, and the ports of the third plurality providing access between the several electrolyte spaces and the first bottom duct are tortuous.

* * * * *